United States Patent [19]

Tajima

[11] Patent Number: 4,987,196

[45] Date of Patent: Jan. 22, 1991

[54] PROCESS FOR ACCELERATIVELY VULCANIZING RUBBERS WITH PROTEIN SERUM

[75] Inventor: Yoshio Tajima, Shizuoka, Japan

[73] Assignee: The Yokohama Rubber Co., Ltd., Japan

[21] Appl. No.: 453,251

[22] Filed: Dec. 20, 1989

Related U.S. Application Data

[63] Continuation of Ser. No. 115,558, Oct. 29, 1987, abandoned, which is a continuation of Ser. No. 873,368, Jun. 12, 1986, abandoned.

[30] Foreign Application Priority Data

Jun. 22, 1985 [JP] Japan .................................. 60-136392

[51] Int. Cl.$^5$ ............................................. C08C 19/20
[52] U.S. Cl. ..................................... 525/346; 525/347; 525/349; 525/350; 525/351

[58] Field of Search ............... 525/346, 347, 349, 350, 525/351, 352

[56] References Cited

U.S. PATENT DOCUMENTS

| | | | |
|---|---|---|---|
| 1,671,314 | 5/1928 | Pratt | 524/704 |
| 2,640,088 | 5/1953 | Glenn | 524/23 |
| 3,113,605 | 10/1963 | Fuetterer | 152/211 |
| 4,202,952 | 5/1980 | Onizawa | 525/332.3 |

*Primary Examiner*—Christopher Henderson
*Attorney, Agent, or Firm*—Finnegan, Henderson, Farabow, Garrett & Dunner

[57] ABSTRACT

A process is disclosed for acceleratively vulcanizing rubber. Starting rubber, natural or synthetic, is combined with specified amounts of a selected accelerator whereby vulcanization characteristics can be greatly improved. Such accelerator has its source of supply from serums by-produced upon treatment of natural rubber latexes.

7 Claims, No Drawings

PROCESS FOR ACCELERATIVELY VULCANIZING RUBBERS WITH PROTEIN SERUM

This application is a continuation of application Ser. No. 115,558, filed Oct. 29, 1987, now abandoned, which is a continuation of application Ser. No. 873,368, filed June 22, 1985.

BACKGROUND OF THE INVENTION

1. Field of the Invention

This invention relates to a process for the vulcanization of rubbers and more particularly to a process for accelerating the same.

2. Description of the Prior Art

It is known that the physical properties and qualities of rubbers can be improved by vulcanization under properly selected conditions. Certain curing or vulcanizing accelerators have been proposed to this end which accelerate the vulcanization rates, reduce the vulcanization temperatures and minimize the sulfur requirements. Accelerators in common use are aldehyde-ammonias, aldehyde-amines, guanidines, thioureas, thiazoles, sulfenamides and the like, all of which are synthetically derived compounds of an organic class and possess good accelerating ability.

Large amounts of the accelerators have heretofore been required to attain adequate tensile strength, which would in turn induce scorching (premature vulcanization) and early aging of vulcanized rubbers. Besides, such synthesized accelerators are literally expensive.

SUMMARY OF THE INVENTION

It has now been found that vulcanization can be effected at increased rate of speed and with optimal scorching time by the addition of a non-rubber material which ma be obtained from serums byproduced during treatment of naturally occurring rubber latexes. Disposal of these serums as waste, as has been usual in the rubber industry, tends to pose environmental pollution problems because they contain proteins and saccharides which readily decompose to develop strong malodors.

The present invention contemplates the utilization of such otherwise undesirable material in rubber vulcanization.

It is therefore the primary object of the present invention to provide a process for acceleratively vulcanizing rubbers by the use of an improved accelerator which is free of the foregoing drawbacks of the prior art, economically feasible and highly capable of giving vulcanized rubbers of enhanced qualities.

This and other objects and advantages of the invention can be achieved by the provision of a process for accelerating the vulcanization of rubbers which comprises adding to a starting rubber an accelerator in an amount of 0.5 to 10 parts per 100 parts of starting rubber, said accelerator being a non-rubber material derived from a serum resulting from coagulation and subsequent removal of its rubber hydrocarbon content substantially fully from a natural rubber latex, and subjecting the resulting mixture to a vulcanization reaction.

DETAILED DESCRIPTION OF THE INVENTION

A process according to the present invention enables rubbers to be acceleratively vulcanized with use of an accelerator later described.

Starting rubbers suitable for the purpose of the invention are those from natural and synthetic sources. Eligible natural starting rubbers are isoprene polymers obtainable from all kinds of rubber-yielding botanical species. Eligible synthetic starting rubbers are vulcanizable polymers and compounds having rubber-like properties and include for example diene polymers, olefin polymers, polysulfide alkylene-sulfides, urethane polymers, vinyl polymers, organic silicon compounds, fluorine compounds and the like.

The term starting rubber as used herein designates a rubber in a masticated form which may be incorporated with suitable additives.

The process of the invention may be effectively applied to the vulcanization of most general-purpose rubbers. It is particularly effective in vulcanizing isoprene polymers which are slow in curing and scorching time.

The term scorching time as used herein designates a length of time consumed prior to the initiation of full vulcanization reaction.

Importantly, the accelerator to be used in the invention is a non-rubber material having its source of supply from a serum byproduced upon treatment of a natural rubber latex. By the term serum as used herein is meant an aqueous solution remaining after the full content of a rubber hydrocarbon is coagulated and removed from such a latex.

An example of the composition of a fresh field rubber latex is given in Table 1.

Serums, collected from industrially treated natural rubber latexes, generally contain an appreciable amount of rubber hydrocarbons. The serums vary in composition depending upon the corresponding latexes and hence are difficult to define with accuracy. The serums are however usually composed of proteins such as $\alpha$-globulin, hevein and the like, fatty acids, amino acids, saccharides, water, inorganic salts such as of potassium (K), magnesium (Mg), copper (Cu), iron (Fe), sodium (Na), phosphorus (P) and the like, and traces of other components. Contained in the serums are traces of rubber ingredients and non-rubber ingredients, generally in-amounts of about 2.0 to 5.0 weight percent, which may be centrifugally separated.

Non-rubber materials separated from the serums are employed as an accelerator according to the invention. The accelerator may be suitably used in the form of a massive solid resulting for example from lyophilization or freeze-drying of the non-rubber materials. Particularly preferred is an accelerator applied in the form of a particulate solid whose average particle size ranges from about 10 to 100 microns.

The desired particulate accelerator may be obtained by adding formic acid or a similar acid to a natural rubber latex to coagulate and remove substantially all of its rubber hydrocarbon content, and then by spraying the resulting serum, either as it is or after concentrated mechanically, through a nozzle or disk type spray drier into a closed chamber maintained at 150° to 250° C. in which sprayed droplets are evaporated dry to give particles of a predetermined particle size between about 10 and 100 microns.

Smaller particle sizes than 10 microns would induce hygroscopicity and hence re-coagulation, resulting in dumpling-like coagula. Greater particle sizes than 100 microns would fail to dissolve in water and solvents. The particle diameter of the accelerator as above specified should be observed to provide a homogeneous blend with starting rubbers.

The amount of the accelerator to be added is preferably in the range between 0.5 and 10 parts per 100 parts of starting rubber (PHR).

Smaller amounts than 0.5 PHR would fail to give sufficient acceleration. Greater amounts than 10 PHR would cause the accelerator to act as a softener or extender, leading to reduced acceleration and hence deteriorated physical properties of the resulting vulcanizates.

The non-rubber materials contemplated by the invention may be used alone as the accelerator but may also be combined, where desired, with various organic compounds preferably such as aldehyde-amines, guanidines, thioureas, thiazoles, thiurams, dithiocarbamates and xanthogenates. Most preferred among those co-accelerators are thiazole carbamate (MBT), dimerized thiazole carbamate (MBTS) and thiazole-para-oxazine carbamate (NOBS) represented respectively by the following formulae.

MBT: 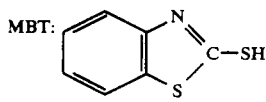

MBTS: 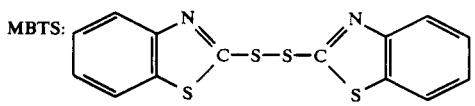

NOBS: 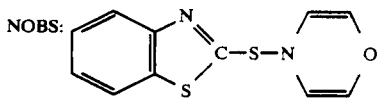

In the case where the accelerator and the co-accelerator are used in combination, the amount of the co-accelerator is preferably in the range between 0.2 and 2.5 PHR.

Smaller amounts than 0.2 PHR would produce insufficient acceleration. Greater amounts than 2.5 PHR would involve extremely shortened scorching time, leading to objectionable premature vulcanization.

In the practice of the process of the invention, the non-rubber material is added to a given starting rubber which has been combined with conventional non-sulfur additives such as antioxidants, reinforcing agents and the like. The resulting mixture is thereafter kneaded and vulcanized under conditions commonly employed in the art. Vulcanization may be effected for instance at 140° to 145° C.

The present invention will now be further described by way of the following examples which are provided for purpose of illustration but not for limiting the invention thereto.

INVENTION EXAMPLES 1 AND 2 AND COMPARISON EXAMPLES 1 AND 2

A serum (non-rubber solids content 4.4% and apparent viscosity 4.2 cp) was collected from a natural rubber latex already free of its rubber hydrocarbon content. The serum was spray-dried into particles by a 28,000 rpm spray drier (L-12 Type, Ohkawara Kakoki Co.) with inlet temperature of 170° C. and outlet temperature of 60° C., thereby obtaining a particulate non-rubber material. This material was spherical in shape with an average particle size of 20 to 30$\beta$, 3.8% in moisture and light yellow to white. Analysis was made at the Japan Food Analyses Center with the results given in Table 2.

The non-rubber material was formulated without the addition of reinforcing agents under conditions shown in Table 3 and kneaded to obtain test specimens according to the invention. The specimens were vulcanized at 140° C., followed by a rheometer test of their vulcanization torque with the results given in Table 4.

Specimens of controls devoid of the non-rubber material but using MBT only as the accelerator were likewise vulcanized and tested with the results shown also in Table 4.

It is to be noted as appears clear from the test results that Invention Examples 1 and 2 are both quite satisfactory in respect of vulcanization characteristics as regards the scorching time, vulcanization speed and vulcanization torque, as contrasted to the controls in Comparison Examples 1 and 2. The scorching time and vulcanization speed were improved considerably, but the torque showed no appreciable rise in the control of Comparison Example 2 in which MBT was added in amounts exceeding standard limits (1 to 2 PHR).

INVENTION EXAMPLES 3 AND 4 AND COMPARISON EXAMPLES 3 AND 4

The same non-rubber material as in Invention Example 1 was formulated with the addition of reinforcing agents, as shown in Table 5, and kneaded to obtain test specimens according to the invention. The specimens were vulcanized at 145° C. and measured for their torque by a biscurometer with the results given in Table 6, together with those obtained for specimens of controls devoid of the non-rubber material but using NOBS only.

It is to be noted that Invention Examples 3 and 4 are both quite satisfactory with respect to the scorching time and vulcanization speed.

TABLE 1

| Composition | Percent by weight in latex | Percent by weight in dry rubber hydrocarbon |
| --- | --- | --- |
| Rubber hydrocarbon | 35.62 | 88.28 |
| Proteins | 2.03 | 5.04 |
| Acetone solubles (fatty acids) | 1.65 | 4.10 |
| Saccharides | 0.34 | 0.84 |
| Ashes (inorganic salts) | 0.70 | 1.74 |
| Water | 59.66 | — |

TABLE 2

| Ingredients | Contents (wt. %) | Method of analysis |
| --- | --- | --- |
| Proteins | 23.6 | Kjeldahl method* |
| Amino acids** | | |
| Arginine | 0.33 | |
| Lysine | 0.53 | |
| Histidine | 0.18 | |
| Phenylalanine | 0.26 | |
| Tyrosine | 0.36 | |
| Leucine | 0.51 | |
| Isoleucine | 0.28 | |
| Methionine | 0.09 | |
| Valine | 0.30 | |
| Alanine | 1.17 | |
| Glycine | 0.87 | |
| Proline | 0.33 | |
| Glutamic acid | 1.39 | |
| Serine | 0.47 | |
| Threonine | 0.30 | |
| Aspartic acid | 1.02 | |

TABLE 2-continued

| Ingredients | Contents (wt. %) | Method of analysis |
|---|---|---|
| Tryptophane | 0.29 | Ultra liquid chromatography |
| Cystine | 0.51 | Performic acid oxidation method |

*Nitrogen-protein conversion factor: 6.25
**Amounts by gram of amino acids in 100 g of sample (No. 16090241-001 of Japan Food Analyses Center)

TABLE 3

| Formulation (ACS No. 1)* | Invention Example 1 | Invention Example 2 | Comparison Example 1 | Comparison Example 2 |
|---|---|---|---|---|
| IR 2200 (Nippon Geon Co.) | 100 | 100 | 100 | 100 |
| Zinc white No. 3 | 6.0 | 6.0 | 6.0 | 6.0 |
| Powdered sulfur | 3.5 | 3.5 | 3.5 | 3.5 |
| Stearic acid (for rubber cure) | 0.5 | 0.5 | 0.5 | 0.5 |
| Non-rubber material | 2.0 | 4.0 | — | — |
| Accelerator (MBT)** | 0.5 | 0.5 | 0.5 | 3.0 |
| Total | 112.5 | 114.5 | 110.5 | 113.0 |

Unit: PHR
*American Chemical Society No. 1 Compound
**Mercapto benzothiazole

TABLE 4

| Vulcanization properties | Invention Example 1 | Invention Example 2 | Comparison Example 1 | Comparison Example 2 |
|---|---|---|---|---|
| Scorching time $T_5$ (min) | 7.5 | 7.4 | 16.0 | 8.3 |
| Vulcanization speed | | | | |
| $T_{50-5}$ (min) | 7.0 | 6.8 | 25.5 | 8.5 |
| $T_{90-5}$ (min) | 16.2 | 15.9 | 35.5 | 17.3 |
| Torque max (inch-lb)* | 33.5 | 35.0 | 24.0 | 30.4 |

*Rheometer: Monsanto Rheometer, TP-100 Type
Temperature: 140° C.
ARC: ±30
Rotor: For use with LPC

TABLE 5

| Formulation | Invention Example 3 | Comparison Example 3 | Comparison Example 4 | Invention Example 4 |
|---|---|---|---|---|
| IR 2200 (Nippon Geon Co.) | 100 | 100 | 100 | 100 |
| Zinc white No. 3 | 5 | 5 | 5 | 5 |
| Stearic acid (for rubber cure) | 2 | 2 | 2 | 2 |
| Powdered sulfur | 2.5 | 2.5 | 2.5 | 2.5 |
| Carbon black | 50 | 50 | 50 | 50 |
| Desolex No. 3 (Showa Oil Co.) | 5 | 5 | 5 | 5 |
| Nocrac 810-Na (Ohuchi Shinko Kagaku Co.) | 1 | 2 | 1 | 1 |
| Non-rubber material | 2.0 | — | — | 7.0 |
| Accelerator (NOBS)* | 0.8 | 0.8 | 1.5 | — |
| Total | 168.3 | 166.3 | 168.0 | 172.5 |

Unit: PHR
*N-Oxydiethylene benzothiazole-2-sulfenamide

TABLE 6

| Vulcanization properties | Invention Example 3 | Comparison Example 3 | Comparison Example 4 | Invention Example 4 |
|---|---|---|---|---|
| Scorching time | | | | |
| $T_5$ (min) | 4.5 | 9.7 | 5.3 | 4.4 |
| $T_{95}$ (min) | 17.7 | 24.8 | 18.7 | 17.3 |
| Vulcanization speed $T_{95}-T_5$ (min) | 13.2 | 15.1 | 13.4 | 12.9 |
| Torque max (kg-cm)* | 47.5 | 39.2 | 45.6 | 45.8 |

*Tester: Biscurometer
Temperature: 145° C.

What is claimed is:

1. A process for accelerating the vulcanization of rubbers which consists essentially of:
   (a) incorporation a vulcanizable starting natural rubber with an accelerator, said accelerator consisting of the nonrubber material separated from the serum resulting from the coagulation of, and subsequent removal of substantially all of the rubber hydrocarbons from, a natural rubber latex, said nonrubber material comprising at least proteins and amino acids occurring in said serum, and said accelerator being added in an amount of 0.5 to 10 parts per 100 parts of said starting natural rubber; and
   (b) kneading and vulcanizing the resulting mixture.

2. The process according to claim 1, said accelerator being in the form of a massive solid or a particulate solid, said particulate solid having an average particle size of about 10 to 100 microns.

3. The process according to claim 1, further comprising adding a co-accelerator to said natural rubber, said co-accelerator being selected from the group consisting of aldehyde-amines, guanidines, thioureas, thiazoles, thiurams, dithiocarbamates and xanthogennates.

4. The process according to claim 1, or 3, said co-accelerator being added in an amount of 0.2 to 2.5 parts per 100 parts of said natural rubber.

5. The method of claim 1, wherein said non-rubber material is obtained by drying said serum and recovering particles of non-rubber materials have an average particle size of about 10 to 100 microns.

6. The method of claim 5, wherein said drying of said serum is accomplished by spray-drying.

7. The method of claim 5, wherein said drying of said serum is accomplished by freeze-drying.

* * * * *

UNITED STATES PATENT AND TRADEMARK OFFICE
CERTIFICATE OF CORRECTION

PATENT NO. : 4,987,196
DATED : January 22, 1991
INVENTOR(S) : Yoshio Tajima It is certified that error appears in the above-identified patent and that said Letters Patent is hereby corrected as shown below:

Column 1, line 9, change "June 22, 1985" to --June 12, 1986--.

Claim 1, column 6, line 30, change "incorporation" to --incorporating--.

Claim 3, col. 6, line 49, change "xanthogennates" to --xanthogenates--.

Signed and Sealed this

Seventh Day of July, 1992

*Attest:*

DOUGLAS B. COMER

*Attesting Officer*     *Acting Commissioner of Patents and Trademarks*